(12) United States Patent
Lesartre et al.

(10) Patent No.: US 9,575,898 B2
(45) Date of Patent: Feb. 21, 2017

(54) IMPLEMENTING COHERENCY WITH REFLECTIVE MEMORY

(71) Applicant: Hewlett-Packard Development Company, L.P., Houston, TX (US)

(72) Inventors: Gregg B. Lesartre, Fort Collins, CO (US); Robert J. Brooks, Fort Collins, CO (US); Blaine D. Gaither, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/763,943

(22) PCT Filed: Mar. 28, 2013

(86) PCT No.: PCT/US2013/034442
§ 371 (c)(1),
(2) Date: Jul. 28, 2015

(87) PCT Pub. No.: WO2014/158173
PCT Pub. Date: Oct. 2, 2014

(65) Prior Publication Data
US 2016/0026576 A1  Jan. 28, 2016

(51) Int. Cl.
*G06F 12/00* (2006.01)
*G06F 12/08* (2016.01)

(52) U.S. Cl.
CPC ....... *G06F 12/0891* (2013.01); *G06F 12/0804* (2013.01); *G06F 12/0837* (2013.01);
(Continued)

(58) Field of Classification Search
CPC .............. G06F 12/0891; G06F 12/0804; G06F 12/0837; G06F 2212/281; G06F 2212/1032; G06F 2212/69
See application file for complete search history.

(56) References Cited

U.S. PATENT DOCUMENTS 5,926,830 A * 7/1999 Feiste ................. G06F 12/0811
711/122
7,000,078 B1 * 2/2006 Jones ................. G06F 12/0833
710/22

(Continued)

FOREIGN PATENT DOCUMENTS

| JP | 2004-038422 | 2/2004 |
| JP | 2009-104300 | 5/2009 |
| TW | 201214115 A | 4/2012 |
| TW | 201248627 A | 12/2012 |

OTHER PUBLICATIONS

Jantsch, Axel. et al., Memory Architecture and Management in an NoC Platform, (Research Paper), Royal Institute of Technology, Stockholm, Sweden, Nov. 26, 2010, 25 pages.
(Continued)

*Primary Examiner* — John A Lane
(74) *Attorney, Agent, or Firm* — International IP Law Group, PLLC

(57) ABSTRACT

Techniques for updating data in a reflective memory region of a first memory device are described herein. In one example, a method for updating data in a reflective memory region of a first memory device includes receiving an indication that data is to be flushed from a cache device to the first memory device. The method also includes detecting a memory address corresponding to the data is within the reflective memory region of the first memory device and sending data from the cache device to the first memory device with a flush operation. Additionally, the method includes determining that the data received by the first memory device is modified data. Furthermore, the method includes sending the modified data to a second memory device in a second computing system.

15 Claims, 5 Drawing Sheets

(52) U.S. Cl.
CPC ............... *G06F 2212/1032* (2013.01); *G06F 2212/281* (2013.01); *G06F 2212/69* (2013.01)

(56) References Cited

U.S. PATENT DOCUMENTS

| | | |
|---|---|---|
| 7,089,391 B2 | 8/2006 | Geiger et al. |
| 7,353,306 B2 | 4/2008 | Thorpe et al. |
| 7,469,321 B2 * | 12/2008 | Heller, Jr. ............ G06F 12/0804 711/135 |
| 7,657,667 B2 * | 2/2010 | Johns .................. G06F 12/0835 710/22 |
| 2003/0110233 A1 | 6/2003 | Prall |
| 2008/0301371 A1 | 12/2008 | Peled et al. |
| 2008/0320253 A1 | 12/2008 | Tomlin et al. |
| 2009/0276578 A1 | 11/2009 | Moyer |
| 2011/0296095 A1 | 12/2011 | Su et al. |
| 2012/0317362 A1 | 12/2012 | Hendry et al. |
| 2012/0317384 A1 | 12/2012 | Munoz et al. |
| 2014/0082300 A1 * | 3/2014 | Han .................... G06F 12/0815 711/141 |

OTHER PUBLICATIONS

PCT: "Notification of Transmittal of the International Search Report and the Written Opinion of the International Searching Authority, or the Declaration"; cited in PCT/US2013/034442; mailed Dec. 2, 2013; 9 pages.

\* cited by examiner

IMPLEMENTING COHERENCY WITH REFLECTIVE MEMORY

BACKGROUND

Modern computing devices execute increasingly complex software applications. In order to decrease the execution time of the complex software applications, some computing devices can execute operations in parallel. For example, a computing device may execute two operations at the same time. In some embodiments, two computing devices may execute operations in parallel by sending and receiving data between the two computing devices.

BRIEF DESCRIPTION

Certain examples are described in the following detailed description and in reference to the drawings, in which.

DESCRIPTION OF THE EMBODIMENTS

According to embodiments of the subject matter described herein, a computing device with reflective memory can implement coherency. Reflective memory, as referred to herein, includes any suitable portion of a memory device in a shared memory system that maintains a common set of data through multiple, separate memory controllers or data management modules. For example, reflective memory may store data in non-volatile memory of a computing system, while also storing a copy of the data in a memory device of a second computing system. Techniques described herein maintain coherency as multiple copies of data are stored in various memory devices within a computing system or within multiple computing systems. Coherency, as referred to herein, includes detecting a modification to a common set of data in a shared memory system and updating copies of the common set of data based on the modification. For example, data associated with a memory address may be copied from a memory device into a cache device. If the processor modifies the data in the cache device, the data in the memory device may be stale or outdated. The techniques described herein can enable coherency in computing devices that include reflective memory.

In some embodiments, the techniques described herein can implement coherency without sending unmodified data from a cache device to a memory device. For example, a processor may access some data values in a cache device in order to read the data values, which does not modify the data values. The processor may also access data values for write operations, which can modify the data values. In some embodiments, the unmodified data values may remain in the cache device, while modified data values are copied to a memory device.

Figure 1:
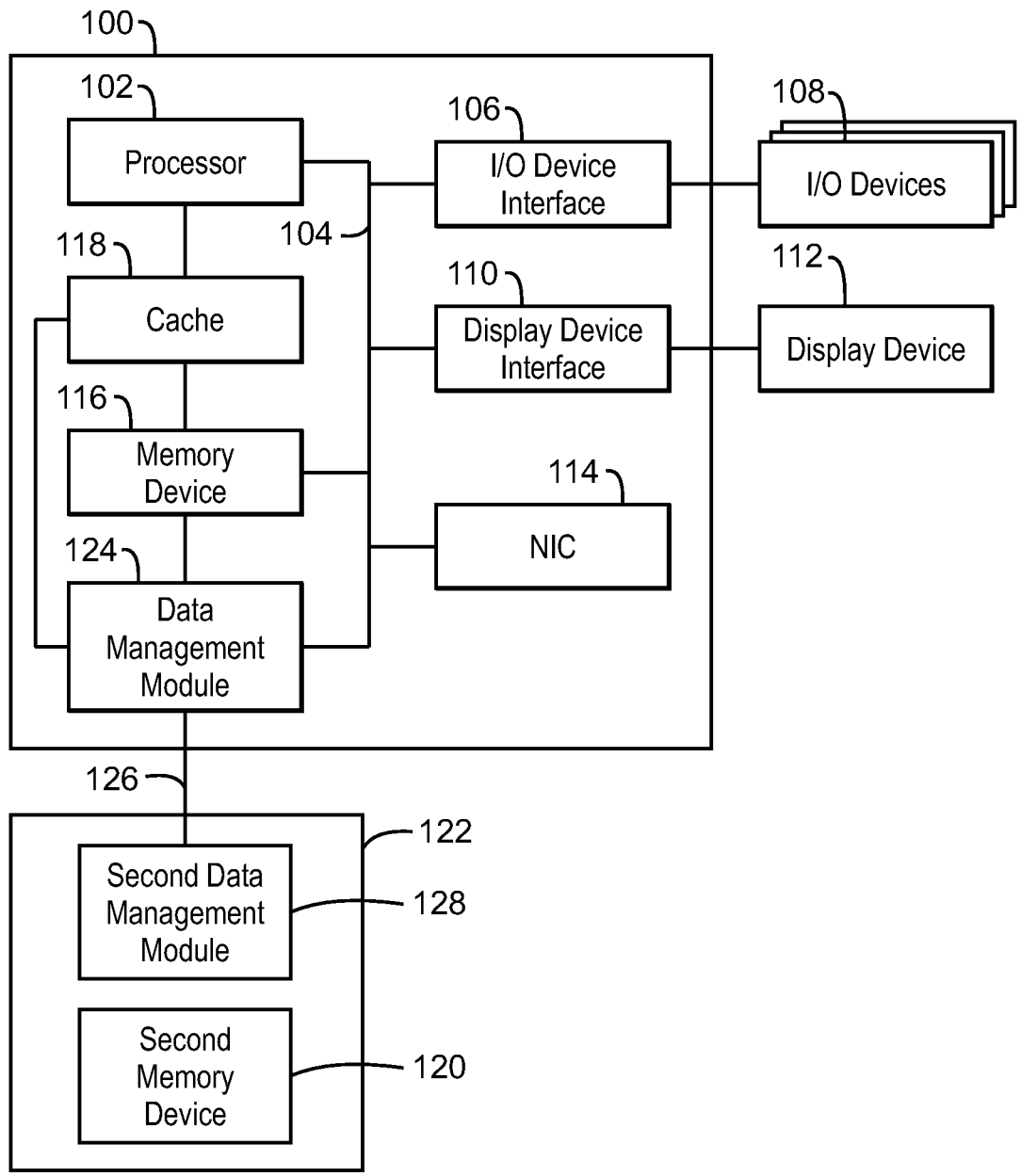
FIG. 1 is a block diagram of an example computing system that can implement coherency in a computing device with reflective memory.

FIG. 1 is a block diagram of an example of a computing system 100 that can implement coherency in a computing device with reflective memory. The computing system 100 may include, for example, a computer server, a mobile phone, laptop computer, desktop computer, or tablet computer, among others. The computing system 100 may include a processor 102 that is adapted to execute stored instructions. The processor 102 can be a single core processor, a multi-core processor, a computing cluster, or any number of other appropriate configurations.

The processor 102 may be connected through a system bus 104 (e.g., AMBA, PCI®, PCI Express®, HyperTransport®, Serial ATA, among others) to an input/output (I/O) device interface 106 adapted to connect the computing system 100 to one or more I/O devices 108. The I/O devices 108 may include, for example, a keyboard and a pointing device, wherein the pointing device may include a touchpad or a touchscreen, among others. The I/O devices 108 may be built-in components of the computing system 100, or may be devices that are externally connected to the computing system 100.

The processor 102 may also be linked through the system bus 104 to a display device interface 110 adapted to connect the computing system 100 to a display device 112. The display device 112 may include a display screen that is a built-in component of the computing system 100. The display device 112 may also include a computer monitor, television, or projector, among others, that is externally connected to the computing system 100. Additionally, the processor 102 may also be linked through the system bus 104 to a network interface card (NIC) 114. The NIC 114 may be adapted to connect the computing system 100 through the system bus 104 to a network (not depicted). The network (not depicted) may be a wide area network (WAN), local area network (LAN), or the Internet, among others.

The processor 102 may also be linked through the system bus 104 to a memory device 116. In some embodiments, the memory device 116 can include random access memory (e.g., SRAM, DRAM, eDRAM, EDO RAM, DDR RAM, RRAM®, PRAM, among others), read only memory (e.g., Mask ROM, EPROM, EEPROM, among others), non-volatile memory, or any other suitable memory systems. In one example, the memory device 116 can include any suitable number of memory addresses that each correspond to any suitable number of data values. In some embodiments, copies of the data values that are frequently accessed can be stored in a cache 118. In some embodiments, the processor 102 may request data from the cache 118 for an operation before requesting data from the memory device 116. In one example, the cache 118 can store fewer data values than the memory device 116, but the cache 118 may provide stored data to the processor 102 faster than the memory device 116 can provide stored data to the processor 102.

In some embodiments, data from the memory device 116 can be reflected in a second memory device 120 of a second computing system 122. The term "reflected," as referred to herein, includes a first computing system producing or writing data, and maintaining a locally coherent copy of said data in a separate memory device on a second computing system. For example, a memory address in the memory device 116 may correspond to a data value that is modified to a new value. To provide for coherency in the memory device 116 and the second memory device 120, the new value of the data is sent, or "reflected" from the memory device 116 to the second memory device 120. The second memory device 120 is associated with a second computer system 122 that can consume the new data value from the memory device 116 in the second computer system's 122 operations. Consuming data, as referred to herein, includes using data in read operations, but not using data in write operations.

In some embodiments, the processor 102 can be linked through the system bus 104 to a data management module 124. The data management module 124 can maintain coherency between data stored in a memory device 116, cache 118, and a second memory device 120. In one embodiment, the data management module 124 can send data to a second memory device 120 through any suitable fabric 126 (e.g., PCI®, PCI Express®, HyperTransport®, Serial ATA, among others), and a second data management module 128 of a second computing system 122. The second data management module 128 can maintain coherency in the data stored in the second memory device 120 of the second computing system 122.

In one embodiment, the data management module 124 can maintain coherency of the stored data by copying modified data in the cache 118 to the memory device 116. Copying modified data from the cache 118 to the memory device 116 is also referred to herein as "flushing" data. In some embodiments, when the data management module 124 flushes data from the cache 118 to a reflected memory range of the memory device 116, a data management module 124 can send the modified data to a second memory device 120. By maintaining coherency of the data stored in a second memory device 120, the second data management module 128 can ensure that operations performed in a second computing device 122 will use modified data forwarded from the configured reflective memory region in a memory device 116. In some embodiments, the second data management module 128 can receive the modified data, and map the modified data into an address range in the second memory device 120.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional memory devices, video cards, additional network interfaces, etc.). Furthermore, any of the functionalities of the data management module 124 may be partially, or entirely, implemented in separate hardware. For example, the functionality may be implemented with an application specific integrated circuit, in a memory device 116, or in a co-processor on a peripheral device, among others.

Figure 2:
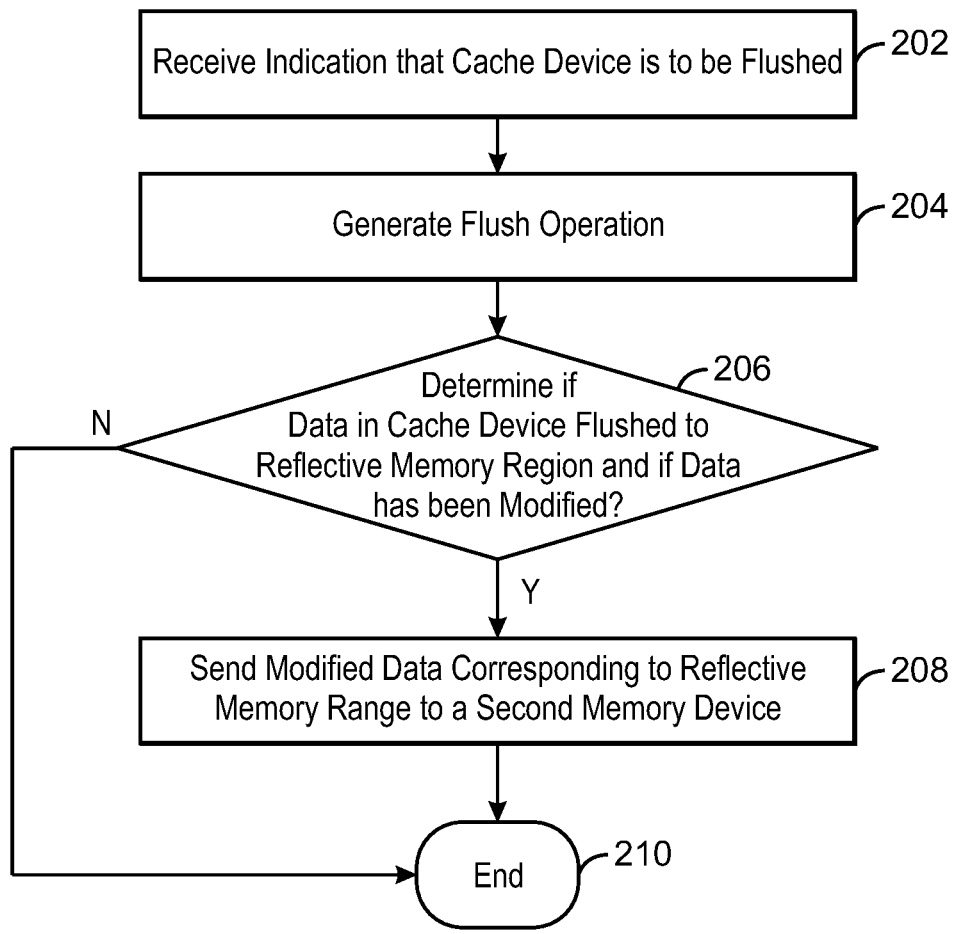
FIG. 2 is a process flow diagram illustrating an example of a method for implementing coherency in a computing device with reflective memory.

FIG. 2 is a process flow diagram illustrating an example of a method for implementing coherency in a computing device with reflective memory. The method 200 can be implemented with a computing device, such as the computing system 100 of FIG. 1.

At block 202, the data management module 124 receives an indication that a cache line is to be flushed from a cache device. As discussed above, a cache device stores any suitable number of cache lines of data, each cache line containing an amount of data, for instance, 16, 32, 64, or 128 bytes of data. Flushing a cache line, as referred to herein, includes sending a modified cache line from a cache device to a memory device. Flushing a cache line also includes deleting an unmodified cache line from the cache device. Cache lines are discussed in greater detail below in relation to FIG. 4. In some embodiments, the data management module 124 can receive an indication from an operating system, or an application, among others. The indication can be any suitable operation, or data that instructs the data management module 124 to instruct a cache device to send modified data to a memory device.

At block 204, the data management module 124 generates flush operations which force cache devices to send data from the cache lines in the cache device to a memory device. In some embodiments, the data management module 124 can generate flush operations using an indication from software, an operating system, or a hardware component. For example, the data management module 124 may detect an indication that a cache line is to be flushed from a cache device to a memory device.

At block 206, the data management module 124 determines if data in cache lines flushed from the cache device is to a reflective memory region of a memory device and if the data has been modified. As discussed above, a reflective memory region can include any suitable portion of a memory device that can maintain coherency with at least one additional memory device. For example, if data is modified in a designated reflective region of a first memory device, copies of the modified data may be sent or reflected to a second memory device that stores copies of the data in the first reflective memory device. In some embodiments, the data management module 124 may determine that a set of memory ranges in memory are to be reflected in any suitable number of additional memory devices.

Data may be flushed from the cache device in response to flush operations generated by the data management module 124 as outlined in block 204, or the cache device may independently choose to flush the cache line. In some embodiments, the data management module 124 can compare the memory address that corresponds to the data to the memory addresses range in the reflective memory region of a memory device. For example, a memory address in cache may be linked to modified data if a processor performs a write operation involving data stored in the cache. In some embodiments, a processor can modify data stored in the cache and track that the data has been modified using the MESI protocol. For example, the cache can include a bit that indicates that a cache line is modified or exclusive. If the cache line is exclusive, the data values stored in the cache line match the data values stored in memory. In some embodiments, an exclusive cache line can become a modified cache line. For example, when a processor performs a write operation on the data stored in an exclusive cache line, the data can be modified and the cache line can become a modified cache line. Modified data stored in cache will not have the same values as the data stored in memory.

If the data management module 124 determines that data in cache lines are flushed from the cache device to the reflective memory region of a memory device and the data has been modified, the process flow continues at block 208. If the data management module 124 determines that data in cache lines are not flushed from the cache device to the reflective memory region of a memory device or the data has not been modified, the process flow ends at block 210.

At block 208, the data management module 124 sends modified data to a second memory device in a second computing system. For example, the data management module 124 can send the modified data from one memory device that includes reflective memory (also referred to herein as a reflective memory device) to a second reflective memory device. In some embodiments, the second reflective memory device may reside in a second computing device. In one example, the second computing device may include a data management module that can copy modified data values to the various memory devices in the second computing device such as non-volatile memory, volatile-memory, or cache, among others. In one embodiment, the data management module 124 can send the modified data to any suitable number of memory devices that store data from reflective memory. The data management module 124 may also send multiple modified data values together to additional memory devices associated with reflective memory. In some embodiments, a second computing system can flush data in a cache device of the second computing system to the second memory device of the second computing device in response to receiving modified data. The process flow ends at block 210.

The process flow diagram of FIG. 2 is not intended to indicate that the operations of the method 200 are to be executed in any particular order, or that all of the operations of the method 200 are to be included in every case. For example, the data management module 124 may not generate flush operations which force cache lines to send modified data to a memory device. Rather, the data management module 124 may detect that a processor has executed a flush operation that flushes potentially modified data to a memory device. Further, any number of additional steps may be included within the method 200, depending on the specific application. For example, the data management module 124 may also detect an evicted cache line from cache. In response to detecting the evicted cache line, the data management module 124 can compare the data in the evicted cache line to the reflective memory region of a memory device and send modified data from the reflective region to a second memory device in a second computing system.

Figure 3:
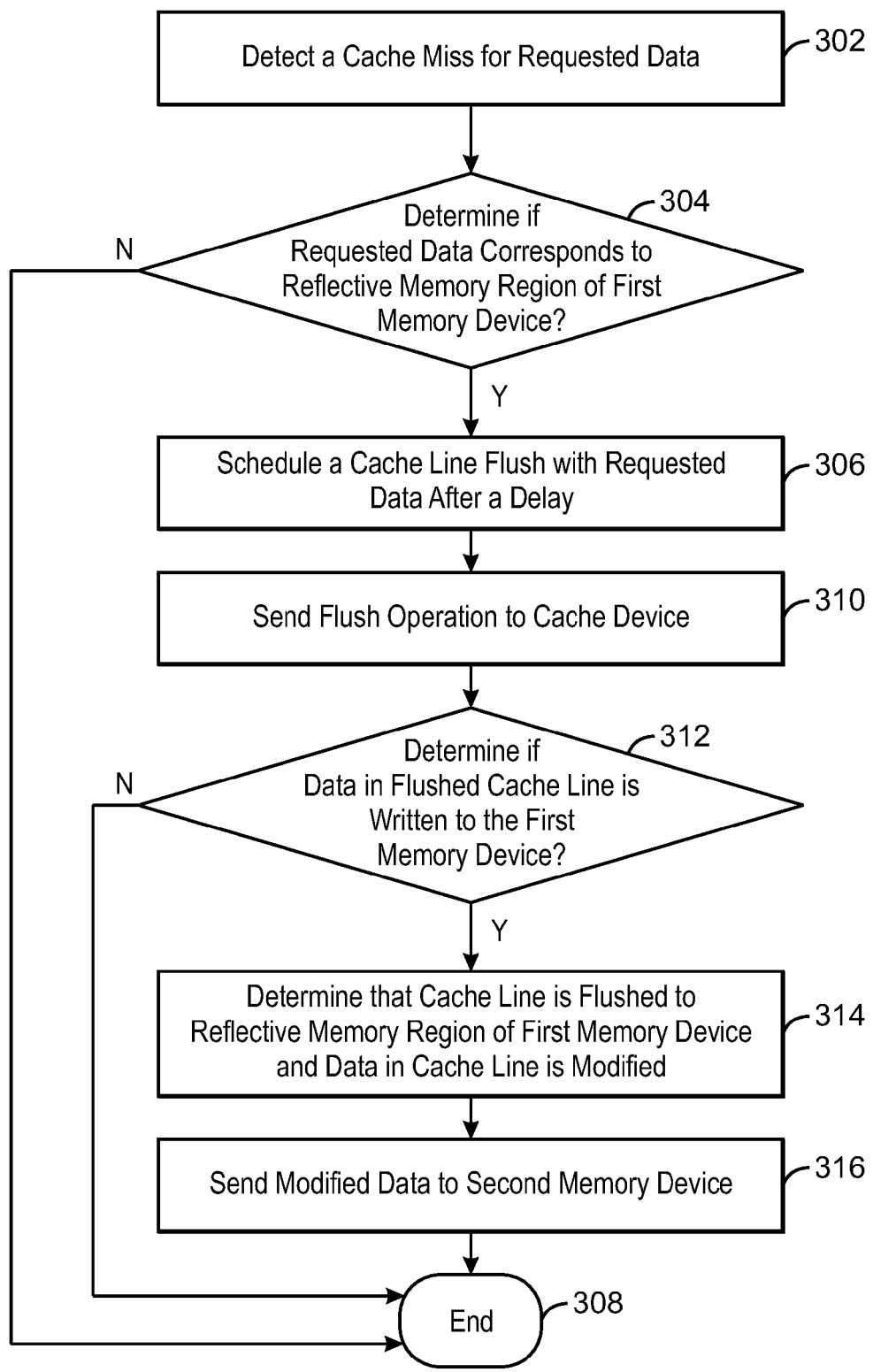
FIG. 3 is a process flow diagram of an example of a method for implementing coherency in a computing device with reflective memory in response to a cache miss.

FIG. 3 is a process flow diagram of an example of a method for implementing coherency in a computing device with reflective memory in response to a cache miss. A cache miss, as referred to herein, includes a processor requesting data from a memory device after the processor determines that the requested data is not stored in the cache device. The method 300 can be implemented with a computing device, such as the computing system 100 of FIG. 1.

At block 302, the data management module 124 can detect a cache miss. In some embodiments, a cache miss results in a processor accessing data in a memory device. For example, the processor may access the data in the memory device in a shared state or an exclusive state. In a shared state, the processor may not be able to modify data in the memory device such as in a read only mode. In an exclusive state, the processor may be able to modify data in the memory device using write operations.

At block 304, the data management module 124 determines whether the memory address of the data accessed by the processor corresponds to a reflective memory region of the memory device. Further, in some embodiments, the data management module 124 determines if the accessed data is provided to the cache device in an exclusive or modified state. As discussed above, reflective memory can include any suitable portion of a memory device that can maintain coherency with at least one additional memory device. For example, if data is modified in a designated reflective region of a first memory device, copies of the modified data may be sent or reflected to a second memory device that also stores the data. In some embodiments, the data management module 124 may determine that a set of memory ranges in memory are to be reflected in any suitable number of additional memory devices. If the data management module 124 determines that the memory address of the data accessed by the processor corresponds to a reflective memory region of the memory device, and that the accessed data has been provided to the cache device in an exclusive or modified state, the process flow continues at block 306. If the data management module 124 determines that the memory address of the data accessed by the processor does not correspond to a reflective memory region of the memory device, or that the accessed data has not been provided to the cache in an exclusive or modified state, the process flow ends at block 308.

At block 306, the data management module 124 schedules a flush of the accessed cache line after a delay. A flush of the accessed cache line can include sending data from the accessed cache line from a cache device to a memory device. At block 310, the data management module 124 sends a flush operation to a cache device. The flush operation can indicate that the cache device is to send a cache line to the memory device.

At block 312, the data management module 124 determines if the data in the flushed cache line is written to the memory device. In some embodiments, the data from the flushed cache line is written to the memory device if the data from the flushed cache line has been modified. For example, a processor may execute a write operation that modifies data in any cache line of a cache device. The modified data stored by the cache line can differ from the data stored in the memory device. Therefore, replacing the data in the memory device with the modified data from the cache can update the data in the memory device. If the flushed cache line is written to the memory device, the process flow continues at block 314. If the flushed cache line is not written to the memory device, the process flow ends at block 308.

At block 314, the data management module 124 determines that data in the cache line is flushed from the cache device to a reflective memory region of a memory device and that the data has been modified. The cache line may have been flushed due to being scheduled in block 306. In some embodiments, the cache line may also have been flushed independently by the cache device 118. In some embodiments, a processor can modify data stored in the cache and indicate that the data has been modified using the MESI protocol. For example, the cache can include a bit that indicates that a cache line is modified or exclusive. Modified data stored in cache will not have the same values as the data stored in memory.

At block 316, the data management module 124 sends modified data from the reflective region of the memory device to a second memory device of a second computing system. For example, the data management module 124 can send the modified data from one memory device that includes reflective memory (also referred to herein as a reflective memory device) to a second reflective memory device. In some embodiments, the second reflective memory device may reside in a second computing device. In one example, the second computing device may include a data management module that can copy modified data values to the various memory devices in the second computing device such as non-volatile memory, volatile-memory, or cache, among others. In one embodiment, the data management module 124 can send the modified data to any suitable number of memory devices that store data from reflective memory. The data management module 124 may also send multiple modified data values together to additional memory devices associated with reflective memory. In some embodiments, a second computing system can flush data in a cache device of the second computing system to the second memory device of the second computing device in response to receiving modified data. The process flow ends at block 308.

The process flow diagram of FIG. 3 is not intended to indicate that the operations of the method 300 are to be executed in any particular order, or that all of the operations of the method 300 are to be included in every case. For example, if a processor evicts a cache line prior to the data management module 124 sending a flush operation to a cache device, the data management module 124 may not send the flush operation to the cache device. Further, any number of additional steps may be included within the method 300, depending on the specific application.

Figure 4:
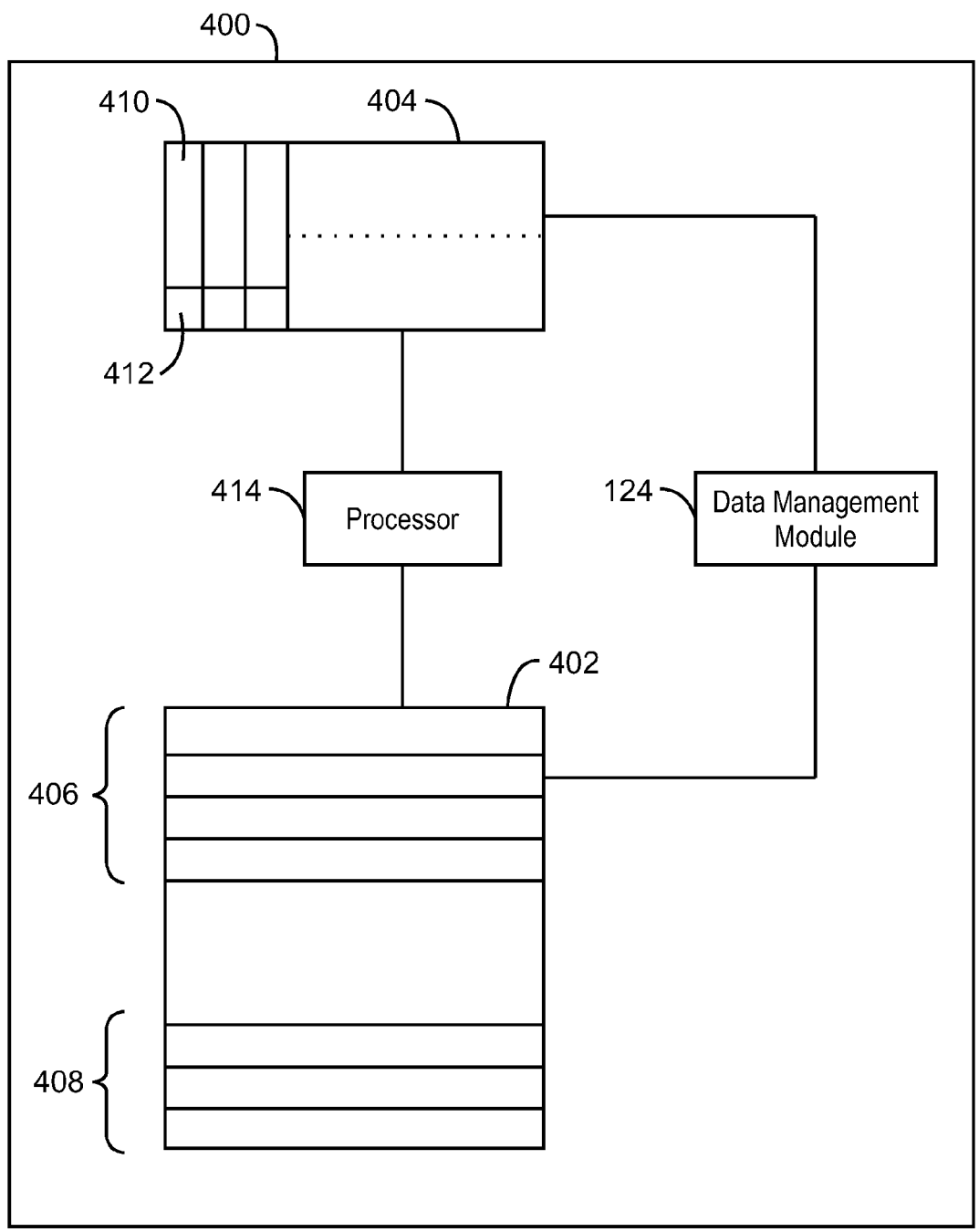
FIG. 4 is a block diagram illustrating an example of how coherency can be implemented in a computing device with reflective memory.

FIG. 4 is a block diagram illustrating an example of how coherency can be implemented in a computing device with reflective memory. In some embodiments, the computing device 400 can include a memory device 402, a data management module 124, and a cache 404. The memory device 402 can store any suitable amount of data 406 associated with any suitable number of memory addresses. In some embodiments, a portion of the memory device 402 can be used as reflective memory 408. As discussed above, the reflective memory 408 can include data held in memory addresses that are to be reflected in additional memory devices. For example, copies of the data stored in reflective memory 408 may be stored in additional memory devices located either locally in the same computing device as the memory device 402, or in a separate computing device. In some embodiments, the portion of the memory device 402 used for reflective memory 408 can be periodically modified to store a different amount of data that is to be reflected.

In some embodiments, the cache 404 can store data in cache lines 410. Each cache line 410 can hold data associated with a memory address. In one embodiment, the cache lines 410 can include a memory indicator bit 412 that indicates if data in the cache line 410 has been modified. For example, a processor 414 may perform a write operation using data from a cache line 410, which can replace the existing data value in a cache line 410 with a modified value. The processor 414 may also change the memory indicator bit 412 from exclusive to modified to indicate that data in the cache line 410 has been modified.

In some embodiments, the data management module 124 can detect a write operation from a software application that indicates a range of memory addresses are to be flushed from a cache device 404 to a memory device 402. For example, the write operation may be transmitted to a control register in the data management module 124. In some embodiments, the control register can indicate any suitable number of memory addresses that should be flushed from a cache device 404 to a memory device 402. The data management module 124 can also generate operations to remove data from any suitable number of cache devices. For example, the data management module 124 can flush the memory addresses in a predetermined range of memory addresses from a cache device 404 to a memory device 402.

Alternatively, the data management module 124 may utilize predetermined information from a memory interface, such as a memory controller, to flush cache lines 410 to a memory device 402. In some embodiments, the predetermined information can include information from a filter cache (also referred to herein as RTAG), or within descriptor fields as proposed for use with a memory mapped storage architecture. In some examples, the data management module 124 can use the predetermined information to determine that a number of cache lines 410 include data from reflective memory 408 in a memory device 402. The data management module 124 may also flush the data from the cache lines 410 to the reflective memory 408 in a memory device 402 before forwarding the data from the cache lines 410 to additional memory devices associated with the reflective memory 408.

It is to be understood that the block diagram of FIG. 4 is not intended to indicate that the computing system 400 is to include all of the components shown in FIG. 4. Rather, the computing system 400 can include fewer or additional components not illustrated in FIG. 4 (e.g., additional memory devices, interfaces, etc.). Furthermore, any of the functionalities of the data management module 124 may be partially, or entirely, implemented in hardware or in the processor 414. For example, the functionality may be implemented with an application specific integrated circuit, in logic implemented in the processor 414, in a module residing in a storage device, or in a co-processor on a peripheral device, among others.

Figure 5:
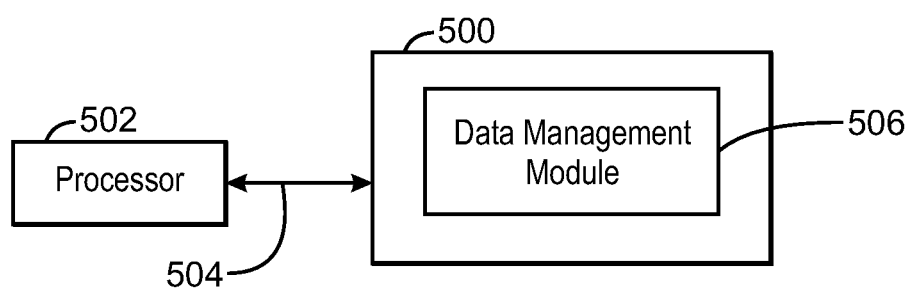
FIG. 5 is a block diagram depicting an example of a tangible, non-transitory computer-readable medium that can implement coherency in a computing device with reflective memory.

FIG. 5 is a block diagram showing a tangible, non-transitory, computer-readable medium 500 that can implement coherency in a computing device with reflective memory. The tangible, non-transitory, computer-readable medium 500 may be accessed by a processor 502 over a computer bus 504. Furthermore, the tangible, non-transitory, computer-readable medium 500 may include computer-executable instructions to direct the processor 502 to perform the steps of the current method.

The various software components discussed herein may be stored on the tangible, non-transitory, computer-readable medium 500, as indicated in FIG. 5. For example, a data management module 506 may be adapted to direct the processor 502 to implement coherency in a computing device with reflective memory. In some embodiments, the data management module 506 can determine that data in cache has been modified and update reflective memory by replacing existing data values with modified data values. The data management module 506 may also send the modified data values to additional memory devices. It is to be understood that any number of additional software components not shown in FIG. 5 may be included within the tangible, non-transitory, computer-readable medium 500, depending on the specific application.

The present examples may be susceptible to various modifications and alternative forms and have been shown only for illustrative purposes. Furthermore, it is to be understood that the present techniques are not intended to be limited to the particular examples disclosed herein. Indeed, the scope of the appended claims is deemed to include all alternatives, modifications, and equivalents that are apparent to persons skilled in the art to which the disclosed subject matter pertains.

What is claimed is:

1. A method for updating data in a reflective memory region of a first memory device comprising:
    receiving an indication that data is to be flushed from a cache device to the first memory device;
    detecting a memory address corresponding to the data is within the reflective memory region of the first memory device;
    sending data from the cache device to the first memory device with a flush operation;
    determining that the data received by the first memory device is modified data; and
    sending the modified data to a second memory device in a second computing system.

2. The method of claim 1, wherein sending data from the cache to the first memory device with a flush operation comprises removing the data from the cache.

3. The method of claim 1, wherein the flush operation forces the cache device to send data from a cache line in the cache device to the first memory device.

4. The method of claim 1, wherein the second computing system receives the modified data, and maps the modified data into an address range in the second memory device.

5. The method of claim 1 comprising sending a set of data from the cache device to the reflective memory.

6. The method of claim 1 comprising sending multiple modified data blocks to a second computing system.

7. The method of claim 1, wherein the second computing system sends data from a second cache device to the second memory device in response to receiving modified data.

8. A system for updating data in reflective memory region of a first memory device comprising:
- a reflective memory region of the first memory device to store data;
- a cache device to store copies of data from the reflective memory region;
- a processor to:
  - detect a cache miss for requested data;
  - determine that the requested data is stored in the reflective memory region of the first memory device;
  - send a copy of the requested data from reflective memory to the cache device;
  - receive data from the cache device in response to a flush operation;
  - determine that the data received from the cache device is modified data; and
  - send the modified data to a second memory device in a second computing system.

9. The system of claim 8, wherein the processor is to schedule the flush operation to be executed.

10. The system of claim 8, wherein the processor is to create a copy of the modified data and send the copy of the modified data to the reflective memory region of the first memory device.

11. The system of claim 8, wherein the flush operation forces the cache device to send data from a cache line in the cache device to the first memory device.

12. The system of claim 8, wherein the cache device comprises a memory indicator bit that indicates data in the cache has been modified.

13. A non-transitory, computer-readable medium comprising a plurality of instructions that, in response to being executed on a computing device, cause the computing device to:
- receive an indication that data is to be flushed from a cache device to a first memory device;
- detect a memory address corresponding to the data is within a reflective memory region of the first memory device;
- send data from the cache device to the first memory device with a flush operation;
- determine that the data received by the first memory device is modified data; and
- send the modified data to a second memory device in a second computing system.

14. The computer-readable medium of claim 13, wherein the second computing system receives the modified data, and maps the modified data into an address range in the second memory device.

15. The computer-readable medium of claim 13, wherein the instructions cause the computing device to send multiple modified data blocks to a second computing system.

* * * * *